United States Patent [19]

Zalucha

[11] 4,322,509

[45] Mar. 30, 1982

[54] FAST CURING PHOSPHATE MODIFIED ANAEROBIC ADHESIVE COMPOSITIONS

[75] Inventor: Denis J. Zalucha, Waterford, Pa.

[73] Assignee: Lord Corporation, Erie, Pa.

[21] Appl. No.: 193,854

[22] Filed: Oct. 3, 1980

[51] Int. Cl.³ .................. C08F 4/34; C08F 30/02; C08F 130/02; C08F 230/02
[52] U.S. Cl. ...................... 525/287; 525/256; 525/263; 526/278
[58] Field of Search .................. 525/287, 263, 256; 526/278

[56] References Cited

U.S. PATENT DOCUMENTS 3,281,500 10/1966 Bauer ................................ 525/287
4,044,044 8/1977 Saito ................................. 526/278

Primary Examiner—William F. Hamrock
Attorney, Agent, or Firm—John A. Gazewood

[57] ABSTRACT

The precipitation from solution of amine phosphate salts is materially inhibited by incorporating at least one carboxylated nitrile elastomer into compositions containing at least one tertiary dimethylaryl amine and at least one unsaturated organic monoester of phosphoric acid.

6 Claims, No Drawings

FAST CURING PHOSPHATE MODIFIED ANAEROBIC ADHESIVE COMPOSITIONS

FIELD OF THE INVENTION

The present invention relates to polymerizable compositions. More particularly, the invention relates to anaerobic adhesive and sealant compositions, especially such compositions containing organophosphate esters.

Anaerobic adhesive and sealant compositions are well-known compositions of matter. Typically, anaerobic adhesive and sealant compositions comprise precatalyzed polymerizable materials, including monomers, polymers and mixtures of monomers and polymers, which cure by a polymerization mechanism which is inhibited by oxygen. Such anaerobic compositions remain in the unpolymerized state as long as adequate contact with oxygen is maintained and cure spontaneously to a solid state upon the exclusion of oxygen. Anaerobic adhesive and sealant compositions are especially useful for locking threaded assemblies, sealing porous and flanged assemblies, strengthening cylindrical assemblies and structural bonding.

From the initial development of anaerobic compositions that could be shipped and stored and cured within a matter of hours after application to metal parts, significant research and development efforts have been, and are still being, expended on improving performance characteristics of anaerobic materials. A meritorious development in the field of anaerobic adhesives was the discovery of Saito, U.S. Pat. No. 4,044,044, that the addition of certain organophosphorus esters to anaerobic adhesive and sealant compositions significantly increased the adhesive strength of anaerobic compositions. While effective in improving adhesion, the addition of organophosphorus esters is accompanied by a significant increase in the time required for cure and, additionally, requires curing temperatures in excess of 100° C. These negative side effects are highly detrimental to commercial use of an otherwise desirable development.

It has been recently discovered that the time required for curing anaerobic adhesive and sealant compositions containing organophosphorus esters corresponding to the general formula

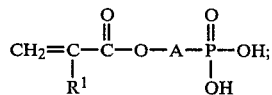

wherein $R^1$ is selected from the group consisting of hydrogen, halogen, an alkyl group having from 1 to 8, preferably 1 to 4, carbon atoms, and $CH_2=CH-$; A is selected from the group $-R^2O-$ and $-(R^3O)_n$, wherein $R^2$ is an aliphatic or cycloaliphatic alkylene group containing from 1 to 9, preferably 2 to 6, carbon atoms; $R^3$ is an alkylene group having from 1 to 7, preferably 2 to 4, carbon atoms; and n is an integer from 2 to 10, is unexpectedly significantly reduced by incorporating therein certain tertiary dimethylaryl amines. In addition to the significant reduction in the time required for curing, the inclusion of the tertiary dimethylaryl amine also significantly reduced the cure temperature. However, the combination of the organophosphorus compound and tertiary amines is reactive to generate in situ an amine phosphate salt which precipitates from the adhesive and sealant composition. Generally, the precipitate is not only not readily redispersible but also quite often forms an insoluble gel.

It has now been discovered that the precipitation of amine phosphorus salts from anaerobic adhesive and sealant compositions containing at least one unsaturated organic monoester of phosphoric acid and at least one tertiary dimethylaryl amine can be substantially, if not entirely, eliminated by incorporating into such compositions minor amounts of carboxylated nitrile elastomer. The incorporation of carboxylated nitrile elastomer into such compositions is also effective to substantially eliminate the undesired gel formation which is now known to result from the separation of the amine phosphate salt as a precipitate from the anaerobic compositions.

More particularly, the present invention provides anaerobic adhesive and sealant compositions containing an anerobically polymerizable material having at least one terminal ethylenically unsaturated group; a polymerization initiator for said anaerobically polymerizable material; at least one unsaturated organic monoester of phosphoric acid; at least one tertiary dimethylaryl amine; and an effective amount of carboxylated nitrile elastomer.

The invention encompasses the composition as a whole, as described above, as well as two-part anaerobic adhesive and sealant compositions wherein the anaerobically polymerizable ethylenically unsaturated material, polymerization initiator, unsaturated organic monoester of phosphoric acid and carboxylated nitrile elastomer are used as a first part and the tertiary amine is used as a second part; and also such two-part anaerobic compositions wherein the anaerobically polymerizable material, polymerization initiator, tertiary amine and and carboxylated nitrile elastomer are used as a first part and the organic monoester of phosphoric acid as the second part. Also contemplated are two-part anaerobic compositions wherein the carboxylated nitrile elastomer is combined into the second part with the organic ester of phosphoric acid or tertiary dimethylaryl amine, as the case may be; as well as two-part anaerobic compositions wherein the carboxylated nitrile elastomer is present in both parts. In the case of any two-part mode, the second part is most commonly used as a surface primer for at least one of the substrates to be joined, prior to the application of the first part comprising anaerobically polymerizable material, although the second part can be admixed with the first part immediately prior to use if so desired.

Substantially any of the known anaerobically polymerizable materials may be employed in the practice of the invention. Typically, anaerobic polymerizable materials range in consistency from a water-like liquid to a light-weight grease; are stable in the presence of oxygen; polymerize in the absence of oxygen through a free radical mechanism initiated by a peroxy compound; can be monomer, or polymer or mixtures of either or both monomers and polymers; and have as a characteristic feature at least one, preferably at least two, terminal ethylenically unsaturated group or groups. Of particular utility are polymerizable polyacrylate (having at least two arceylic or substituted acrylic moieties) monomers and polymers. Monoacrylate esters can also be used, especially if the nonacryalte portion of the ester contains a hydroxyl or amino group, or other reactive substituent which serves as a site for potential crosslinking.

Representative of suitable anaerobically polymerizable materials which can be employed in the practice of the invention are the following non-limiting materials:

(I) Polyacrylates comprising the reaction products of at least two mols of acrylic and substituted acrylic acids with appropriate alcohols having at least two hydroxyl groups, such as di-, tri-, and tetraethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, tetramethylene glycol diacrylate, neopentyl glycol diacrylate and trimethylopropane triacrylate.

(II) Polyacrylates comprising the reaction product of at least two mols of acrylic and substituted acrylic acids with di- and tri-alkylolamines.

(III) The reaction products of acrylic and substituted acrylic acids with hydroxyl-containing saturated polyesters obtained by condensation of aliphatic and aromatic acids, such as adipic acid, sebacic acid, dimeric fatty acid, phthalic acid, isophthalic acid, and terephthalic acid with an excess of one or more polyols having at least two hydroxy groups, such as glycerol, trimethylol propane, ethylene glycol, propylene glycol, butylene glycol, diethylene glycol and polyethylene glycol.

(IV) Monoesters of acrylic and substituted acrylic acids, that is, esters containing a single acrylate or substituted acrylate group, especially such esters wherein the nonacrylate moiety possesses a single polar group selected from the group consisting of labile hydrogen, heterocyclic ring, hydroxy, amino, cyano and halogen polar groups. Representative monoesters include cyclohexyl methacrylate, tetrahydrofurfuryl methacrylate, hydroxyethyl acrylate, hydroxyethyl methacrylate, hydroxypropyl methacrylate, t-butylaminoethyl methacrylate, cyanoethyl acrylate and chloroethyl methacrylate.

(V) The reaction products of an excess of acrylic and substituted acrylic esters containing an active hydrogen in the nonacrylate moiety of such esters with organic polyisocyanates, including isocyanate-functional prepolymers. Preferably, the active hydrogen is the hydrogen of a hydroxy, primary amine or secondary amine. Typical acrylic and substituted acrylic esters include, without limitation, hydroxyethyl methacrylate, cyanoethyl acrylate, t-butylaminoethyl methacrylate and glycidyl methacrylate. Typical polyisocyanates include, without limitation, toluene diisocyanate, 4,4'-diphenyl diisocyanate, di-anisidine diisocyanate, cyclohexylene diisocyanate, 2-chloropropane diisocyanate, 4,4'-diphenylmethane diisocyanate, 2,2'-diethyl ether diisocyanate, 3-(dimethylamino)-pentane diisocyanate, isophorone diisocyanate, tetrachlorophenylene diisocyanate -1,4 and trans-vinylene diisocyanate. Other useful polyisocyanates are the isocyanate-functional prepolymers obtained by reacting an excess of at least one polyisocyanate, such as those described above, with polyamines containing terminal primary and secondary amine groups or polyhydric alcohol such as glycerol, 1,2,6-hexane triol, 1,5-pentane diol, ethylene glycol, polyethylene glycol, trimethylol propane, polyethers and hydroxy-functional polyesters.

(VI) Reaction products of acrylic and substituted acrylic acids with epoxy compounds and hydroxy-functional polycarbonates. For a complete discussion of anaerobically polymerizable materials, including monomeric and polymeric materials, reference is made to U.S. Pat. Nos. 2,895,950; 3,041,322; 3,043,820; 3,046,262; 3,203,941; 3,218,305; 3,300,547; 3,425,988; 3,457,212; 3,625,930; 4,007,323; 4,018,851; 4,107,386; and French Pat. No. 1,581,361.

Naturally, anaerobically polymerizable materials can be used in combination. Many of such anaerobically polymerizable materials, especially of the polymeric type, are quite viscous and are advantageously mixed with lower viscosity anaerobically polymerizable materials.

Substantially all of the known polymerization initiators which have been employed with anaerobic adhesive and sealant compositions can be utilized in the practice of this invention. Among the more widely used are organic peroxides, especially hydroperoxides derived from hydrocarbons having up to 18 carbon atoms and peroxides having a half-life period of 10 hours at a temperature in the range of 80° C. to 140° C., with organic hydroperoxides being currently preferred. Representative organic peroxides include benzoyl peroxide, methyl ethyl ketone peroxide, cyclohexanone peroxide, lauroyl peroxide, dicumyl peroxide, cumene hydroperoxide, t-butyl hydroperoxide, methyl ethyl ketone hydroperoxide, diisopropyl benzene hydroperoxide, t-butyl perbenzoate, di-t-butyl-diperoxyphthalate, 2,5-dimethyl -2,5-bis-(t-butylperoxy)-hexane, bis-(1-hydroxycyclohexyl) peroxide, t-butyl-peroxyacetate, 2,5-dimethyl-hexyl- 2,5-di-(peroxybenzoate), t-butyl peroxy-isopropyl carbonate, n-butyl-4,4-bis-(t-butylperoxy) valerate, 2,2-bis(t-butylperoxy)-butane and di-t-butyl peroxide. Other known initiators for anaerobic compositions can also be used, for example, a mixture of n-dodecyl mercaptan and o-sulfobenzoic imide. The polymerization initiators, of whatever type, are typically employed in an amount in the range from 0.01 to 20 percent by weight, preferably 0.1 to 10 percent by weight, based on the total weight of anaerobically polymerizable materials.

The organophosphorus compounds which are employed in the practice of the present invention have the characteristic formula

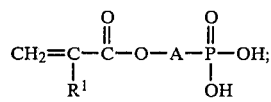

wherein $R^1$ is selected from the group consisting of hydrogen, halogen, an alkyl group having from 1 to 8, preferably 1 to 4, carbon atoms, and $CH_2=CH-$; and A is selected from the group consisting of $-R^2O-$ and $(R^3O)_n$, wherein $R^2$ is an aliphatic or cycloaliphatic group containing from 1 to 9, preferably 2 to 6, carbon atoms; $R^3$ is an alkylene group having from 1 to 7, preferably 2 to 4, carbon atoms; and n is an integer from 2 to 10. Representative organophosphorus compound include, without limitation, 2-methacryloyloxyethyl phospate, 2-acryloyloxyetheyl phosphate, methyl-(2-methacryloyloxyethyl) phosphate, ethyl methacryloyloxyethyl phosphate; ethyl acryloyloxyethyl prosphate, methyl acryloyloxyethyl phosphate and ethyl acryloyloxyethyl phosphate. The organophosphorus compounds are present in a concentration from 0.05 to 20, preferably 0.1 to 10, percent by weight, based on total weight of anaerobically polmerizable material.

The anaerobic adhesive and sealant compositions of this invention also contain at least one dimethyl arylamine having the general formula

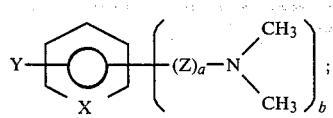

wherein Z is methylene, X is a carbon or nitrogen atom; Y is selected from the group consisting of hydrogen, hydroxy, amino, alkyl of 1 to 8, preferably 1 to 4 carbon atoms and alkoxy having from 1 to 8, preferably 1 to 4 carbon atoms; a is zero or 1; and b is 1 or 2. Exemplary of such tertiary dimethylaryl amines are N, N-dimethylaniline, N, N-dimethylaminomethyl phenol, N, N-dimethyl-p-toluidine and N, N-dimethylaminopyridine. The dimethylaryl amine compounds are employed in a concentration in the range from 0.01 to 10, preferably 0.5 to 5 percent by weight, based on total weight of anaerobically polymerizable material and organophosphorus compound.

The carboxylated nitrile materials which are employed in the compositions of the invention consist essentially of interpolymers of 1,3-buytadiene, acrylonitrile and a carboxyl-containing monomer. Such interpolymers typically contain from 12 to 50 percent by weight acrylonitrile and from 0.01 to 15 percent carboxylated monomer, with the balance of the interpolymer being 1,3-butadiene. Especially preferred carboxylated monomers are the olefinically unsaturated carboxylic acids characterized by the presence of one or more olefinic carbon-to-carbon double bonds and one or more carboxyl groups. Representative carboxylated monomers include acrylic acid, alpha-chloracrylic acid, methacrylic acid, alpha-isopropylidene acrylic acid; alpha-styryl acrylic acid, beta-vinyl acrylic acid, beta-acryloxyacetic acid, maleic acid, fumaric acid, itaconic acid, citraconic acid, alpha-butylcrotonic acid, hydrosorbic acid, sorbic acid, alpha-bromosorbic acid, crotonic acid, oleic acid and linolenic acid. The carboxylated nitrile elastomers are further characterized by a glass transition temperature below 30° C., preferably below 10° C. Such carboxylated nitrile elastomers are well-known in the art and need not be discussed in detail. Carboxylated nitrile elastomers suitable for use in the practice of the invention are available commercially, for example, under the trade name "HYCAR" from B. F. Goodrich Company and "KRYNAC" from Polysar Ltd. The carboxylated nitrile elastomers will be employed in an amount in the range from 1 to 150, preferably 2.5 to 100 percent by weight, based on total weight of anaerobically polymerizable material.

In addition to the necessary anaerobically polymerizable material, initiators, organophosphorus compounds, dimethylaryl amines and carboxylated nitrile elastomer, the anaerobic adhesive and sealant compositions of the invention can contain optional additives conventionally employed in compositions, such as accelerators, polymerization inhibitors, thickeners, plasticizers, dyes and the like, at concentration levels normally employed in the art. Representative accelerators include aromatic hydrazines, tertiary amines other than the herein-described dimethylaryl amines, ferrocene compounds, carboxylic hydrazides, N,N-dialkylhydrazines, carboxylic sulfimides, mercaptans, transition metal salts, sulfonyl hydrazones, organic disulfonamides and organic sulfonic acid hydrazides.

The anaerobic and sealant compositions of this invention can be produced as a single-package system by simply mixing the components at room temperature. Alternatively, although there is no advantage in doing so, the compositions can be produced as two-package systems in which either the dimethylaryl amines or the organophosphorus compound is provided as one package and all other ingredients are mixed into a second package except that the carboxylated nitrile elastomer can be incorporated into either package.

When employed as a single-package system, small quantities of the compositions are introduced between the surfaces to be bonded, after which the surfaces are contacted as to exclude air or oxygen. When used as a two-package system, the two packages can be intermixed at time of use of form a single composition. Alternatively, the package containing the dimethylaryl amine or organophosphorus compound can be applied as a primer to at least one of the mating surfaces with the package containing the main adhesive or sealant mass being applied as a covercoat over the primed or unprimed mating surface, as desired.

The compositions of the present invention are especially adapted to treating non-vitreous non-porous materials, such as metals.

The invention is further described in the following examples, which are preferred embodiments of the invention and are not to be construed in limitation thereof.

EXAMPLE

Polymerizable anaerobic formulations are prepared having the compositions shown in Table I, with all concentrations in parts by weight, unless otherwise noted. The formulations are used to adhere SAE 1010 cold rolled steel lap strips together. The bond area is 6.5 sq cm, with an uncontrolled glue line of approximately 0.02 to 0.05 mm. The strips are pulled apart with an Instrom tester in a tensile shear test (ASTM D-1000-77) commonly used in the adhesive industry. In the data, "handling time" is the time required for polymerization to advance to the degree that the bonded assembly can be moved as a unit by manupulating, such as by touching, one of the lap strips; and "separation time" is the time required for precipitation of insoluble amine-phosphate salt.

TABLE I

| | Composition Stability and Performance Information on High Performance Anaerobic Adhesives | | | | | | |
|---|---|---|---|---|---|---|---|
| COMPOSITION NUMBER | 1 | 2 | 3 | 4 | 5 | 6 | 7 |
| Ethyleneglycol dimethacrylate | 75 | 75 | 100 | 50 | 50 | 50 | 50 |
| 2-Methacryloyloxyethyl phosphate | — | 2 | 2 | — | 2 | 2 | 2 |
| Carboxylated Nitrile Elastomer[a] | 25 | 25 | — | 50 | 50 | 50 | 50 |
| N,N-dimethyl aniline | — | — | 2 | 2 | 2 | 2 | 2 |
| Cumene hydroperoxide | 2 | 2 | 2 | 2 | 2 | 2 | 2 |
| o-Sulfobenzoicimide | 1 | 1 | 1 | 1 | 1 | 1 | 1 |
| p-Benzoquinone | 0.04 | 0.04 | 0.04 | 0.04 | 0.04 | 0.04 | 0.04 |

TABLE I-continued

Composition Stability and Performance Information on High Performance Anaerobic Adhesives

| COMPOSITION NUMBER | 1 | 2 | 3 | 4 | 5 | 6 | 7 |
|---|---|---|---|---|---|---|---|
| Age at use | 1 day | 1 day | 1 day | 1 day | 1 day | 3 mo. | 1 day |
| Handling time | 20 hrs | none | 3 hrs | 40 min | 3 hrs | 1 hr | 3-6 hrs |
| Separation time | none | none | 1 hr | none | 3 wks | — | — |
| Shear strength (MPa) | | | | | | | |
| Solvent wipes SAE-1010 CRS | — | — | — | 1.4 | 4.0 | 5.5 | 4.6 |
| Grit blasted SAE-1010 CRS | — | — | — | 8.8 | — | 19.1 | 13.6 |

<sup>a</sup>HYCAR ® 1072 carboxylated nitrile elastomer, B.F. Goodrich Co., as a 25% by wt sol in methylmethacrylate.
<sup>b</sup>What appears to be a uniform anaerobic gel has begun in the bottom of the container; but, comparing compositions Nos. 5 and 6, which are identical except for age, the performance of the adhesive remains high even after 3 mos.
<sup>c</sup>ASTM D-1002-77; uncontrolled glue line.

In the data, composition No. 1 is a control adhesive. Comparison of compositions. Nos. 1 and 2 shows that the addition of 2-hydroxy-ethylmethacrylate acid phosphate prevents polymerization of the adhesive at room temperature. Comparison of compositions Nos. 2 and 3 shows that addition of the tertiary dimethylaryl amine, N, N-dimethyl aniline, accelerates the cure of the adhesive; but, without the carboxylated nitrile elastomer, the phosphate amine salt separates rapidly. Adhesive composition No. 4 contains all of the ingredients which are necessary in the practice of the invention except the organophosphorus compound and serves as a control for bond strength. Addition of the organophosphorus compound (2-hydroxyethylmethacrylate acid phosphate) to composition No. 4 to produce compositions Nos. 5, 6 and 7 triples the shear strength on solvent wiped cold rolled steel, and doubles the shear strength on grit blasted cold rolled steel. Compositions 5 and 6 are the same adhesive tested at two time three months apart. Composition No. 7 is a fresh version of composition No. 5 for comparison with composition No. 6. It appears that, as composition No. 5 ages, the cure time shortens and bond strength increases. It is speculated that this may result from a molecular weight buildup in storage. In the case of composition No. 5, a gel begins in the bottom of the container at approximately 3 weeks, but it is not the separation which is seen when the carboxylated nitrile elastomer is not present.

Composition No. 5 is also effective as an adhesive for non-ferrous materials such as galvanized steel and aluminum.

What is claimed is:

1. An anaerobic adhesive and sealant composition comprising
   (a) at least one anaerobically polymerizable material having at least one acrylic or substituted acrylic unsaturated group;
   (b) at least one organic peroxide;
   (c) at least 0.05 percent by weight, based on weight of anaerocially polymerizable material, of at least one organic monoester of phosphoric acid having the formula $$CH_2=C-C-O-A-P-OH;$$
$$\phantom{xxxx}|\phantom{xxxxxxx}||\phantom{xxxxx}||$$
$$\phantom{xxxx}R^1\phantom{xxxxxx}O\phantom{xxxxx}OH$$

(with both C=O and P=O)

wherein $R^1$ is selected from the group consisting of hydrogen, halogen, an alkyl group having from 1 to 8 carbon atoms and $CH_2=CH-$; A is selected from the group consisting of $-R^2O-$ and $(R^3O)_n$, wherein $R^2$ is an aliphatic or cycloaliphatic group having from 1 to 9 carbon atoms, $r^3$ is an alkylene group having from 1 to 7 carbon atoms, and n is an integer from 2 to 10;

(d) at least 0.01 percent by weight, based on total weight of said anaerobically polymerizable adhesive and sealant composition, of at least one tertiary amine having the formula

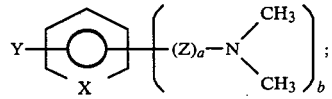

wherein Z is methylene; X is a carbon or nitrogen atom; Y is selected from the group consisting of hydrogen, hydroxy, amino, alkyl of 1 to 8 carbon atoms, and alkoxy having from 1 to 8 carbon atoms; a is zero or 1; and b is 1 or 2; and (e) an effective amount, based on total weight of anaerobically polymerizable material of at least one carboxylated nitrile elastomer consisting essentially of interpolymers of 1,3-butadiene, acrylonitrile and a carboxyl-containing monomer.

2. An anaerobic adhesive and sealant composition according to claim 1 where the amount of said carboxylated nitrile elastomer is in the range of up to 150 percent by weight.

3. An anaerobic adhesive and sealant composition according to claim 2 wherein the amount of said tertiary amine is in the range from 0.01 to 10 percent by weight.

4. An anaerobic adhesive and sealant composition according to claim 3 wherein said organic ester of phosphoric acid comprises 2-methacryloloxyethyl phosphate.

5. An anaerobic adhesive and sealant composition according to claim 3 wherein said tertiary amine comprises N,N-dimethyl aniline.

6. An anaerobic adhesive and sealant composition according to claim 5 wherein said organic ester of phosphoric acid comprises 2-methacryloyloxyethyl phosphate.

* * * * *